United States Patent Office 3,291,844
Patented Dec. 13, 1966

3,291,844
CATALYTIC PREPARATION OF FLUOROETHERS
John D. Watson, Sr., Lake Jackson, Tex., assignor to The Dow Chemical Company, Midland, Mich., a corporation of Delaware
No Drawing. Filed Oct. 10, 1963, Ser. No. 315,401
4 Claims. (Cl. 260—614)

This invention relates to a process for preparing alkyl fluoroalkyl ethers and more particularly is concerned with a novel catalytic process for preparing such ethers from reaction of unsaturated, aliphatic perfluorocarbons and saturated aliphatic alcohols.

Ordinarily in the preparation of fluoroethers by the reaction of unsaturated fluorocarbons and alcohols a strong base or alkali metal is used as reaction intermediate. These basic or metallic materials react with the alcohol to form an alcoholate. These processes have the disadvantage that the alcoholate is somewhat hard to produce and maintain, i.e. to keep from decomposing under reaction conditions because of its water sensitivity. Also, since the alcoholate reaction promoter ordinarily is prepared in excess of that required it must be removed from the reaction mass at the end of the reaction period. This separation is achieved with some difficulty.

Other reported processes have employed basic catalysts in the preparation of fluoroalkyl ethers (see U.S. Patent 2,409,274 and J. Am. Chem. Soc., 71, 2337 [1949]) with varying degrees of success.

It is a principal object of the present invention to provide a novel method for preparing alkyl fluoroalkyl ethers employing an alkali fluoride acidic catalyst.

It is another object of the present invention to provide a novel process for preparing alkyl fluoroalkyl ethers using an alkali metal fluoride reaction promoter which is stable during the reaction and from which the product mass readily is separated at the completion of the reaction.

It is a further object of the present invention to provide a novel process for preparing alkyl fluoroalkyl ethers wherein the need for preparing an alcoholate intermediate is eliminated.

It is also an object of the present invention to provide a novel process for preparing alkyl fluoroalkyl ethers wherein (1) the alkali metal fluoride reaction promoter is not water sensitive and does not attack the reaction equipment to any marked degree, (2) the reaction mixture is substantially neutral, and (3) there is substantially no decomposition of the catalytic reaction promoter during reaction.

These and other objects and advantages readily will become apparent from the detailed description presented hereinafter.

In general the present process entails reacting an olefinic or acetylenic perfluorocarbon of from 2 to about 6 carbon atoms with a saturated monohydroxy unsubstituted aliphatic alcohol of from 1 to about 4 carbon atoms in the presence of an alkali metal fluoride or aqueous solution of alkali metal fluoride to prepare the corresponding alkyl fluoroalkyl ether from the olefinic perfluorocarbon or alkyl fluoroalkene ether from the acetylenic fluorocarbon and recovering the so-produced product.

The term "alkali metal fluoride" as used herein is meant to include lithium fluoride, sodium fluoride, potassium fluoride, rubidium fluoride and cesium fluoride.

Ordinarily the process is carried out by introducing the olefinic or acetylenic perfluorocarbon over a period of time of from several hours to several hundred hours into an excess of the aliphatic alcohol containing the alkali metal fluoride as a dispersed solid or aqueous solution at about room temperature, i.e. from about 18 to about 30° C. Conveniently, unsaturated perfluorocarbon from a pressurized source is added either continuously or periodically to the alcohol and alkali metal fluoride which are in a reactor system and maintained under a reduced pressure. This addition is carried out at a rate to provide a predetermined pressure in the system and over a period of time until an amount, at a maximum, equal to that required for stoichiometric balance for production of the alkyl fluoroalkyl ether on a gram mole basis is introduced into the alcohol.

Ordinarily, however, an excess of the aliphatic alcohol over that required for ether formation is employed. The amount of this excess alcohol is not critical. However, for ease of handling usually from about 3 to about 8 gram-moles of alcohol above that theoretically required for ether formation are employed. The alkyl fluoroalkyl ether product readily can be recovered from the reaction mass by adding water thereto to provide a two phase system of the ether product and aqueous alcohol which readily can be separated one from the other.

Alternatively, the ether product can be separated from the reaction mass by fractional distillation and other liquid separation and recovery techniques as is understood by one skilled in the art. If desired, the alkali metal fluoride catalyst and any excess alcohol reactant can be recovered from the residual reaction mass after separation of the ether product.

The catalyst can be crystallized from the aqueous resultant liquor or the liquids flashed off. Any excess alcohol reactant conveniently can be removed by fractional distillation, for example.

The weight ratio of aliphatic alcohol/alkali metal fluoride catalyst to be employed ranges from about 120 to about 3. The smaller amounts of catalyst provide an initial saving in raw material costs while larger amounts of catalyst increases the rate of reaction. The alkali metal fluoride catalyst can be used alone or as an aqueous solution. In the latter form the concentration of the solution is not critical. With extremely dilute solutions, however, the large amounts of liquid may create problems in separation.

The reaction readily can be carried out at atmospheric pressure or reduced pressures and room temperature. This provides for the use of readily obtainable reactors and material handling and transporting equipment. However, if desired higher pressures and temperatures, e.g. up to 50 atmospheres and up to 200° C., can be used if desired.

The following examples will serve to further illustrate the present invention but are not meant to limit it thereto.

*Example 1*

About 100 milliliters of methanol (about 79 grams) and about 10 grams of substantially anhydrous potassium fluoride were introduced into a 250 milliliter filtering flask. The flask was sealed and connected to a vacuum pump which removed air from the system. After substantially all the air had been removed, hexafluoropropylene ($C_3F_6$) from a pressurized cylinder was controllably introduced into the flask at a rate to provide a system pressure of about 5 pounds per square inch gauge. The pressure of the system was maintained substantially constant over a 15 hour period by continuous controlled introduction of $C_3F_6$ into the flask. The total amount of $C_3F_6$ added was about 64 grams. This provided a reaction mixture containing about 5 gram-moles of methanol in excess of that required theoretically for formation of methyl 1,1,2,3,3,3-hexafluoropropyl ether.

After this period, the liquid reaction mass was removed from the flask and a large amount, about 1500 milliliters, of chilled water added thereto. The methyl 1,1,2,3,3,3-hexafluoropropyl ether product separated as a substantially water-insoluble layer. This product was separated from the aqueous layer.

About 68.5 grams of the methyl 1,1,2,3,3,3-hexafluoropropyl ether was recovered. This corresponded to about 83% conversion of $C_3F_6$ reactant into the desired ether product.

*Example 2*

About 300 milliliters of ethanol (~237 grams) and a solution of 2 grams potassium fluoride dissolved in 25 milliliters of water were placed in a one-liter filtering flask connected to a vacuum pump. (This provides a $$C_2H_5OH/KF$$

weight ratio of about 120.) Substantially all the air was removed from the system. A total of about 150 grams of hexafluoropropylene was introduced periodically over a period of about 200 hours as the pressure was observed to drop below about 0 pounds per square inch gauge. This provided a reaction mixture having about 4 gram-moles ethanol in excess of that theoretically required for preparation of ethyl 1,1,2,3,3,3-hexafluoropropyl ether. After this period, the liquid reaction mass was removed from the filtering flask and the product ethyl 1,1,2,3,3,3-hexafluoropropyl ether separated out by adding a large amount, about 1500 milliliters, of chilled water to the liquid.

About 130 grams of ethyl 1,1,2,3,3,3-hexafluoropropyl ether separated as a substantially water-insoluble layer and was recovered. This corresponded to about 71.5% conversion of the hexafluoropropylene to the ether product.

*Example 3*

About 100 milliliters of methanol (~79 grams, about 2.5 gram-mole) and a solution of about 10 grams potassium fluoride in 25 milliliters water were placed in a 250 milliliter filtering flask connected to a vacuum pump and a cylinder of hexafluorobutyne-2 ($CF_3$—C≡C—$CF_3$). Following the procedure described for Example 2, air was removed from the system and about 21 grams (~0.13 gram mol) of the hexafluorobutyne-2 added periodically to the reactor over a period of about 250 hours. The resulting product mass consisted of two layers. Upon removal from the reactor and analysis by mass spectrometry, the top layer (about 120 milliliters) was found to consist primarily of methanol and about 5% of 1,1,1,4,4,4-hexafluoro, 2-methoxy butene-2. The bottom layer (about 8 milliliters) consisted of about 95% of this ether product and about 5% 1,1,1,4,4,4-hexafluoro 2,3-dimethoxy butane. Total ether product yield indicated about a 78.5% conversion of the hexafluorobutyne-2.

*Example 4*

Following the procedure described in Example 2, about 20.6 grams of hexafluoropropylene were added periodically over a period of 150 hours to about 300 milliliters of ethanol and 10 milliliters of 1.0 N cesium fluoride solution (1.52 grams $C_sF$) in a two-liter filtering flask.

Following the reaction period, the liquid reaction mass was removed from the flask and the substantially water insoluble product ether separated out by adding a large excess of water thereto. About 6.5 grams of ethyl 1,1,2,3,3,3-hexafluoropropyl ether was recovered, this being about a 24.3% conversion of the $C_3F_6$ reactant.

In a manner similar to that described for the foregoing examples hexafluoropropylene can be reacted with isopropanol in the presence of sodium fluoride to prepare isopropyl 1,1,2,3,3,3-hexafluoropropyl ether. Similarly, tetrafluoroethylene can be reacted with ethanol in the presence of rubidium fluoride to prepare ethyl 1,1,2,2-tetrafluoroethyl ether. Likewise potassium fluoride can be used to catalyze the preparation of propyl 1,1,2,3,3,4,4,5,5,6,6-dodecafluorohexyl ether from propanol and dodecafluorohexylene. Also lithium fluoride can be employed to catalyze the formation of butyl 1,1,2,3,3,3-hexafluoropropyl ether from butanol and hexafluoropropylene. Additionally, 1,1,1,4,4,5,5,5-octafluoropentyne-2

$$(CF_3—C≡C—CF_2—CF_3)$$

can be reacted with methanol in the presence of potassium fluoride to prepare 1,1,1,4,4,5,5,5-octafluoro, 2-methoxy pentene-2.

Various modifications can be made in the present invention without departing from the spirit or scope thereof for it is understood that I limit myself only as defined in the appended claims.

I claim:

1. A process for preparing fluoroethers which comprises;
   (a) placing a mixture of a saturated monohydroxy unsubstituted aliphatic alcohol and an alkali metal fluoride in a reaction vessel, said alcohol having from 1 to about 4 carbon atoms and the weight ratio of said alcohol to said alkali metal fluoride ranging from about 120 to about 3,
   (b) removing substantially all of the air from said reactor,
   (c) introducing over a period of time at about room temperature and subatmospheric pressure a member selected from the group consisting of olefinic and acetylenic perfluorocarbons into said reaction vessel, said perfluorocarbon containing from 2 to about 6 carbon atoms, the amount of said perfluorocarbon at a maximum being about equal to that required for stoichiometric balance for production of the corresponding alkyl fluoroalkyl ether, or alkyl fluoroalkene ether and recovering the corresponding alkyl fluoroalkyl ether or alkyl fluoroalkene ether therefrom.

2. A process for preparing methyl 1,1,2,3,3,3-hexafluoropropyl ether which comprises;
   (a) introducing methanol and potassium fluoride into a reaction vessel, the weight ratio of said methanol to said potassium fluoride being about 8,
   (b) removing substantially all of the air from the reaction vessel,
   (c) controllably introducing at about room temperature hexafluoropropylene into the methanol and potassium fluoride mixture, the amount of methanol and hexafluoropropylene being such that the reaction mixture had $CH_3OH/C_3F_6$ gram-mole ratio of about 6,
   (d) adding water to the final reaction mixture thereby to provide a two-phase liquid system of substantially water immiscible methyl 1,1,2,3,3,3-hexafluoropropyl ether and an aqueous solution of methanol and said potassium fluoride, and
   (e) separating said methyl 1,1,2,3,3,3-hexafluoropropyl ether from said aqueous solution.

3. A process for preparing ethyl 1,1,2,3,3,3-hexafluoropropyl ether which comprises;
   (a) introducing ethanol and potassium fluoride into a reaction vessel, said potassium fluoride being added as an aqueous solution and the weight ratio of $C_2H_5OH/KF$ being about 120,
   (b) removing substantially all of the air from the reaction vessel,
   (c) controllably introducing at about room temperature hexafluoropropylene into the ethanol and potassium fluoride mixture, the amount of ethanol and hexafluoropropylene being such that the reaction mixture had a $C_2H_5OH/C_3F_6$ gram-mole ratio of about 5,
   (d) adding water to the final reaction mixture thereby to provide a two-phase liquid system of substantially water immiscible ethyl 1,1,2,3,3,3-hexafluoropropyl ether and an aqueous solution of ethanol and potassium fluoride, and
   (e) separating said methyl 1,1,2,3,3,3-hexafluoropropyl ether from said aqueous solution.

4. A process for preparing 1,1,1,4,4,4-hexafluoro, 2-methoxy butene-2 which comprises;
   (a) introducing methanol and potassium fluoride into a reaction vessel, said potassium fluoride being added as an aqueous solution and the weight ratio of $CH_3OH/KF$ being about 8,
   (b) removing substantially all of the air from the reaction vessel,
   (c) controllably introducing at about room temperature hexafluorobutyne-2 into the methanol and potassium fluoride mixture, the amount of methanol and hexafluorobutyne-2 being such that the reaction mixture had a $CH_3OH/CF_3-C\equiv C-CF_3$ gram-mole ratio of about 20,
   (d) reacting said mixture at about room temperature thereby to prepare a two-phase liquid system, one of said phases consisting primarily of methanol and the other of said phases consisting primarily of 1,1,1,4,4,4-hexafluoro, 2 methoxy butene-2, and
   (e) separating said 1,1,1,4,4,4-hexafluoro, 2 methoxy butene-2 from the alcoholic layer.

No references cited.

LEON ZITVER, *Primary Examiner.*

HOWARD T. MARS, *Assistant Examiner.*